United States Patent [19]

Hoshino

[11] Patent Number: 4,869,147

[45] Date of Patent: Sep. 26, 1989

[54] ATTACHMENT OF SUPPORT LEG FOR BASE DRUM

[75] Inventor: Yoshihiro Hoshino, Nagoya, Japan

[73] Assignee: Hoshino Gakki Co., Ltd., Japan

[21] Appl. No.: 218,947

[22] Filed: Jul. 13, 1988

[30] Foreign Application Priority Data

Apr. 5, 1988 [JP] Japan ............................ 63-045900[U]

[51] Int. Cl.⁴ ............................................ G10D 13/02
[52] U.S. Cl. ....................................... 84/421; 403/391
[58] Field of Search ............ 84/411 R, 411 A, 411 M, 84/411 P, 412–421; 248/188; 403/391

[56] References Cited

U.S. PATENT DOCUMENTS

| | | | |
|---|---|---|---|
| 2,745,181 | 5/1956 | Czerniewicz | 403/391 X |
| 3,945,291 | 3/1976 | Zickos | 84/421 |
| 4,640,175 | 2/1987 | Hoshino | 84/421 |
| 4,747,569 | 5/1988 | Hoshino | 84/421 X |

FOREIGN PATENT DOCUMENTS

| | | |
|---|---|---|
| 1042699 | 11/1958 | Fed. Rep. of Germany ...... 403/391 |
| 56-5119 | 2/1981 | Japan . |
| 58-37101 | 8/1983 | Japan . |
| 59-21427 | 6/1984 | Japan . |

Primary Examiner—L. T. Hix
Assistant Examiner—Brian W. Brown
Attorney, Agent, or Firm—Ostrolenk, Faber, Gerb & Soffen

[57] ABSTRACT

A holding and positioning member for a leg of a bass drum to provide a support for the drum. A seat plate attached to the drum body is provided with a pair of grooves defining an inverted V and passing on opposite sides of a screw hole. An additional groove is provided transverse to the V grooves. The leg may be selectively supported in any of the grooves. A cover plate is secured over the seat plate by a screw passing through the cover plate and the seat plate. Bosses on the cover control tilting when the cover is tightened over the seat plate and the leg. A spring between the cover and the seat plate permits the cover to tilt.

16 Claims, 3 Drawing Sheets

ATTACHMENT OF SUPPORT LEG FOR BASE DRUM

BACKGROUND OF THE INVENTION

The present invention relates to a support leg for a bass drum and means for freely adjusting and thereafter maintaining the position and length of the support leg of the bass drum.

For a conventional bass drum support leg, the direction of the support leg may be freely adjustable with respect to the drum body and it is maintained in a selected adjusted orientation with respect to the drum body so that the support leg has a prescribed incline, to either the right or the left side. This is described, for example, in Japanese Utility Model Publications Nos. 56-5119; 58-9271; and 58-37101. A flexible structure is provided so that the length of the support leg may be adjusted readily at the same time in many cases.

SUMMARY OF THE INVENTION

The present invention also relates to adjusting and maintaining the angle, direction and length of the support leg of the bass drum. The purpose of this invention is to provide a simplified structure which is convenient to handle and with a reduced number of parts minimizing the manufacturing cost and making it possible for the user to easily install the support leg.

In the present invention, a leg is inserted into a selected one of a plurality of installation grooves defined in a seat plate that is fixed to the drum body. The seat plate and the leg in a groove are covered over by a cover. Securement means secure the cover to the seat plate. Those means are in the form of a screw that is screwed into a screw hole in the seat plate through the cover plate. This fixes the leg on the drum body.

Securement means receiving means in the form of a screw hole is provided approximately at the center of the seat plate. Two installation grooves are formed in the seat plate, symmetrically in the shape of an inverted V, that is inclined outwardly from the upper edge of the seat plate to the lower edge, and they extend past both sides of the screw hole.

A third groove across the other two grooves holds the leg for transport of the drum by orienting the leg so that it will not project beyond the top and bottom edges of the drum.

Protrusions having a height slightly shorter than the gap between the seat plate and the cover at the time when the leg is held in an installation groove are disposed in that gap, outward of the installation grooves. They project, for instance, from the seat plate.

A compression spring between the cover and the seat plate, preferably around the screw, provides an elastic connection between the seat plate and the cover and permits that tilting of the cover as the screw is tightened to bring the cover against the leg and the cover protrusion against the seat plate.

The support leg according to the present invention accurately and in one operation adjusts the leg direction and leg length to a prescribed position of the support leg by using an extremely simple structure. The present invention reduces the number of parts involved, reduces the manufacturing costs, facilitates handling by the user, as compared with the conventional structure of this type.

The foregoing and other objects and features of the present invention are described in the following description and accompanying drawings.

DESCRIPTION OF THE PREFERRED EMBODIMENTS

Figure 1:
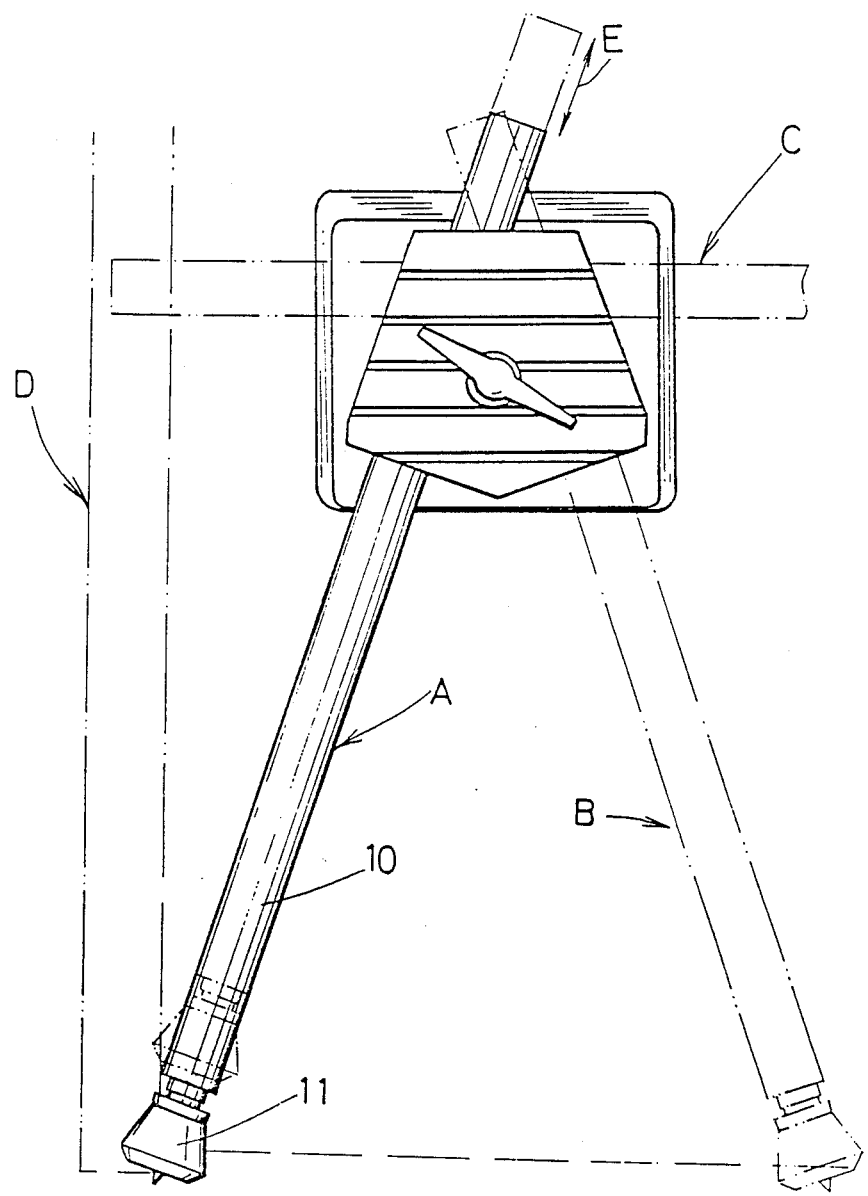
FIG. 1 is a front view of a bass drum support leg of the present invention.

Referring to FIG. 1, the support leg 10 is shown installed at the body of the bass drum D. The leg is maintained at a predetermined angle of incline on either of the right or left sides of the drum, as shown by the solid line position A and the broken line position B in FIG. 1. In addition, the support leg can be slid vertically and longitudinally if necessary in the directions indicated by the arrows E in order to adjust the operative length of the leg. In FIG. 1, the support leg 10 can also be accommodated transversely of the axis of the drum as is shown by the broken line position C to facilitate transport of the drum with the leg on it.

Figure 2:
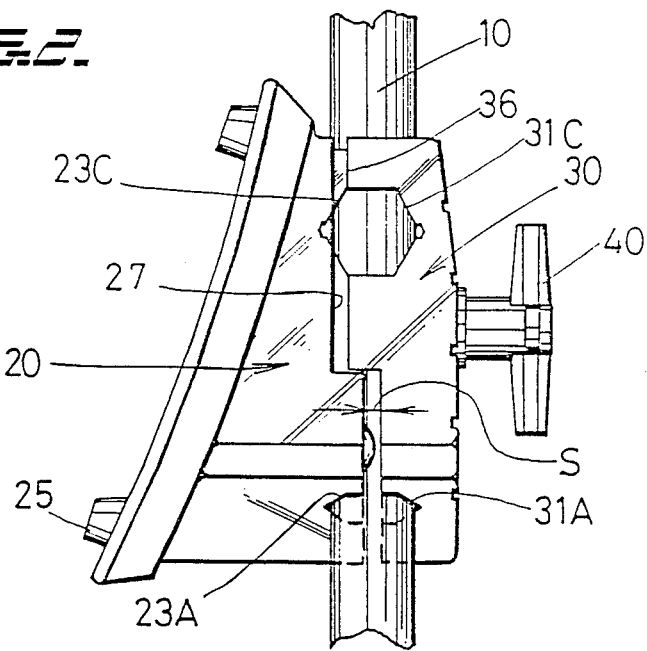
FIG. 2 is an enlarged side view of essential elements of the present invention adjacent the upper, attachment portion of the leg.
Figure 3:
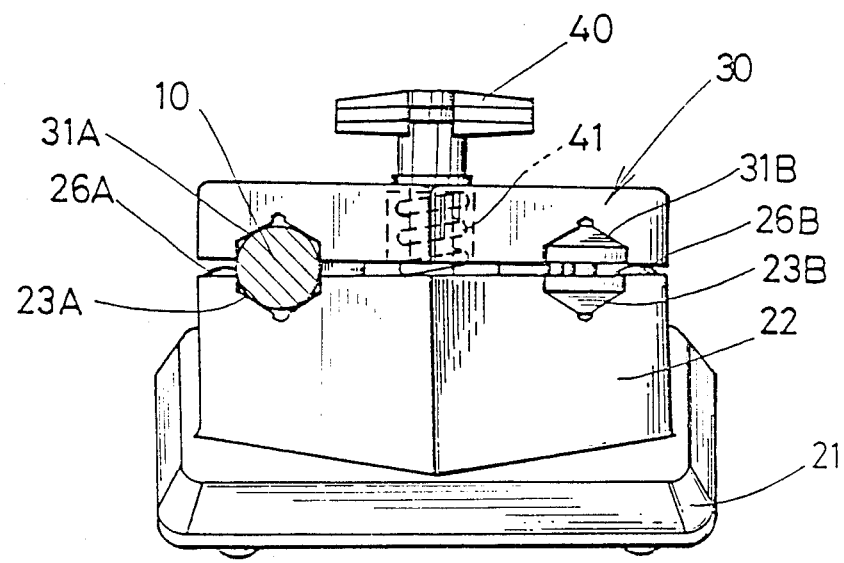
FIG. 3 is a bottom view partly in section of the elements shown in FIGS. 1 and 2.

In FIGS. 2 and 3, the leg 10 comprises an elongate bar with a round cross-section. It has a leg tip 11 made of rubber, at least at its tip, and the free end tip on the leg is arranged so that it will resist being distorted by the surface on which it rests and will in turn not damage that surface.

The leg 10 is inserted into a selected installation groove 23A, 23B, or 23C which is formed in the seat plate 20. The leg 10 is fixed to the drum body where it is covered by an upper cover 30 that is held by a tightening screw 40 that is screwed through the hole 24 on the seat plate from the upper surface of the upper cover 30.

Figure 4:
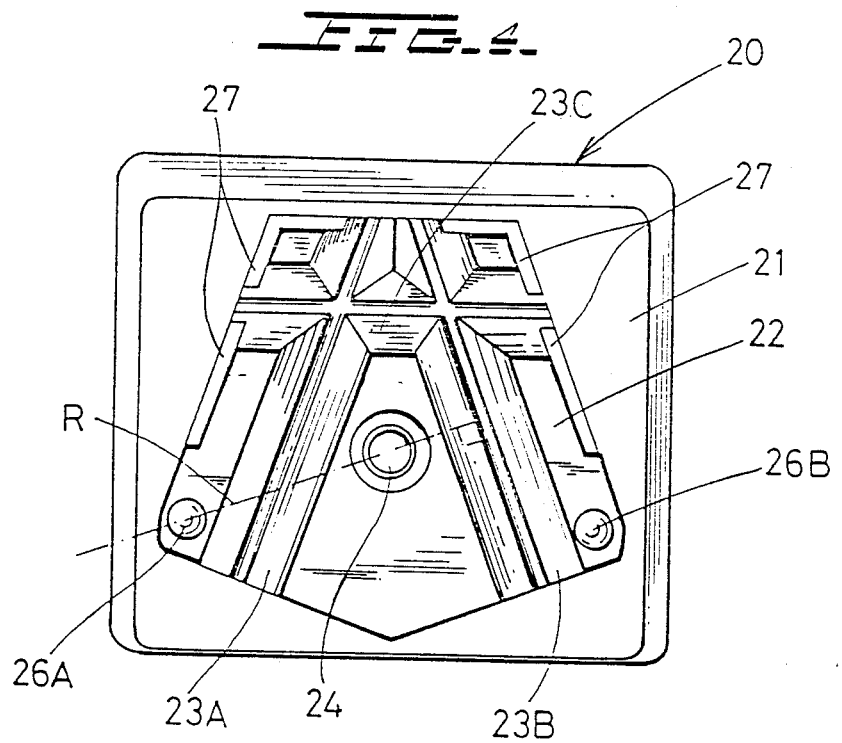
FIG. 4 is an expanded front view of the installation groove and the protrusion of the seat plate in the support for the leg shown in FIG. 1.

In FIGS. 2 and 4, the seat plate 20 is formed by an approximately pentagonal orthogonal body 22 located on the upper surface of a dish-like base plate 21 having the approximate shape of a rectangle and which is shaped also to fit the surface of the drum body. The base plate 21 is secured to the body of the drum by the connector 25. Securement means receiving means in the form of a screw hole 24 is provided approximately at the center of the surface of the seat plate 22 for reception of a tightening screw 40.

In FIG. 4, on both sides, that is, to the right and left sides of the screw hole 24, two installation grooves 23A and 23B are defined which together form an inverted V. The grooves extend inclined from the upper edge to the lower edge of the seat plate body 22. Each groove can hold the leg 10 in the respective selected direction.

There is in addition a groove 23C for accommodating the leg 10 during transportation. Groove 23C is essentially horizontal, is near the upper part of the seat plate 22 and crosses the installation grooves 23A and 23B. Groove 23C orients the leg 10 in the position C of FIG. 1 to facilitate transport of the bass drum.

Protrusions 26A and 26B are provided on the seat plate 22 and are located toward the bottom of the seat plate and outward of the installation grooves 23A and 23B. These protrusions have a height above seat plate 22 which is slightly less than the gap S (see FIG. 2) between the seat plate 20 and the upper cover 30 at the time when the leg 10 is held by one of the installation grooves 23A and 23B.

It is desirable at the time of securement for at least one protrusion 26A outward of one groove 23A to be formed on an imaginary line R which directly crosses the other groove 23B perpendicularly by passing through the screw hole 24.

A profiled set of steps 27 (FIG. 4) is provided on the seat plate body 22 for engaging the upper cover 30.

Figure 5:
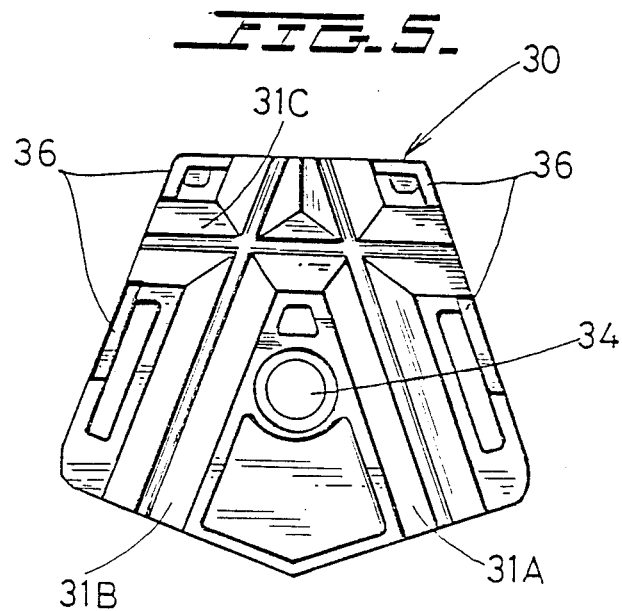
FIG. 5 is an expanded view of the reverse side of an upper cover which overlies the seat plate shown in FIG. 4.

The upper cover 30 in FIG. 5 is a plate with the same peripheral shape as the main plate 22 of the seat plate 20. The cover 30 has a screw hole 34 at the approximate center for receiving the tightening screw 40. On the reverse or inwardly facing side of the upper cover 30, there are leg holding grooves 31A, 31B and 31C which are complementary to and overlie the installation grooves 23A, 23B and 23C at the corresponding locations on the seat plate member 20. Together the overlying grooves are generally shaped to the profile of the leg 10. As seen in FIG. 3, the cross-section of the combined closed installation groove combinations 23A, 31A; 23B, 31B; and 23C, 31C is preferably hexagonal so that the side of the leg 10 will be definitely supported at at least four points.

An engagement part 36, with the step part 27 for the seat plate member, is provided for positioning purposes. In FIGS. 2 and 3, the tightening screw 40 is screwed into the screw hole 24 of the seat plate 20 through the upper cover 30 for holding the leg 10 in the selected position.

A spring 41 around the stem of the screw 40 pushes inward against the body 22. There is a chamber 42 inside the cover 30 and opening toward the seat plate 22 in which the spring 41 is housed. The spring presses against the outer wall of that chamber and urges the cover 30 outward against the collar 43 on screw 40. This arrangement makes the connection between plate 22 and cover 30 elastic, which allows the cover 30 to reorient itself against both the leg 10 and one or both of the protrusions 26.

In operation, the leg 10 is inserted into a selected installation groove 23A, 23B or 23C and is covered by the upper cover 30. The leg 10 is held in the installation groove 23A, 23B or 23C and the complementary leg holding grooves 31A, 31B or 31C of the upper cover 30.

If the leg 10 is in grooves 23A, 31A, the protrusion 26B, which has been provided outside of the installation groove 23B, and which is on the opposite side of the body 22 from the installation groove 23A, touches the reverse side of the upper cover 30, as a result of tightening of the screw 40.

In this case, the height of the protrusion 26B is slightly less than the height of the gap S (shown in FIG. 2) between the seat plate and the upper cover 30 at the time when the leg 10 is being held so that even at the time when the screw 40 is being tightened, the upper cover 30 is held approximately horizontal or parallel as compared with the front of the seat plate 20.

If the upper cover 30 and the seat plate 20 are held approximately horizontal or parallel when the tightening screw 40 is being tightened, an approximately uniform tightening force is applied to the leg 10 as it is held by the selected groove, with the result that the so-called pinching phenomenon, which can make the adjusted position of the drum inaccurate, will not be produced. If one of the protrusions 26 is formed on a line passing through the screw hole 24 and perpendicularly to the other opposite inclined groove, that protrusion will be located on the perpendicular line from the screw hole where the tightening strength works most effectively.

If the leg 10 is inserted into the horizontal groove 23C, the seat plate is maintained in contact with both protrusions 26A and 26B of the upper cover upon tightening of the screw 40.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A support leg for a drum, comprising:

a seat plate for being secured to the side of a body of the drum, the seat plate having a a central region and securement means receiving means in the central region of the seat plate; the seat plate having a top and a bottom edge; the seat plate having an outer surface;

first and second installation grooves being defined in the outer surface of the seat plate, the installation grooves being inclined with respect to each other and extending from the top edge to the bottom edge of the seat plate and passing by opposite sides of the securement means receiving means;

a leg of a length greater than the height from the top edge to the bottom edge of the seat plate; the leg being installable in a selected one of the installation grooves and when so installed, the leg being of a thickness to project out of the outer surface of the seat plate; the leg being adjustable lengthwise along the selected installation groove;

a cover for being supported over and above the outer surface of the seat plate; securement means for attaching the cover over the seat plate by the securement means extending into the securement means receiving means on the seat plate and for thereby clamping the leg in the selected installation groove of the seat plate, and the thickness of the leg placed in one of the intallation grooves creating a gap between the cover and the seat plate;

a protrusion between the seat plate and the cover and the protrusion having a height slightly less than the height of the gap between the seat plate and the cover with the cover secured to the seat plate over the leg; upon tightening of the cover down upon the leg and the seat plate, the cover resting against the leg and the cover twisting its orientation so that the cover presses upon the leg while the protrusion between the cover and the seat plate is also pressed upon by the cover and the seat plate.

2. The support leg for a drum of claim 1, wherein the installation grooves are oriented to together generally define the shape of an inverted V, from the top edge to the bottom edge of the seat plate.

3. The support leg for a drum of claim 2, wherein the installation grooves are arranged symmetrically at opposite sides of the securement means receiving means on the seat plate.

4. The support leg for a drum of claim 3, wherein there are two of the protrusions, each between the cover and the seat plate and outward of and to the side of a respective installation groove.

5. The support leg for a drum of claim 4, wherein the protrusions are located generally toward the bottom edge of the seat plate.

6. The support leg for a drum of claim 5, wherein the protrusions are attached to the seat plate so that the cover presses upon a selected one of the two protrusions.

7. The saupport leg for a drum of claim 1, wherein a third groove is defined in the seat plate oriented transversely of the first and second grooves and oriented such that with the leg installed in the third groove, the leg would not extend beyond the top and bottom edges of the drum to which the seat plate is attached.

8. The support leg for a drum of claim 5, wherein a third groove is defined in the seat plate oriented transversely of the first and second grooves and oriented such that with the leg installed in the third groove, the leg would not extend beyond the top and bottom edges of the drum to which the seat plate is attached, the third groove being defined generally toward the top of the seat plate, such that upon tightening of the cover over the seat plate, the cover is reoriented to rest against the leg and the protrusions.

9. The support leg for a drum of claim 3, wherein the securement means comprises a screw which is tightened through the cover and into the seat plate and is tightened to the seat plate, such that tightening of the screw tightness the cover to the seat plate.

10. The support leg for a drum of claim 3, further comprising a compression spring disposed between the seat plate and the cover and acting in opposition to the securing means, providing elasticity in the connection between the cover and the seat plate such that when the securing means is tightened over the leg, the cover may reorient itself to press upon the leg and the protrusion.

11. The support leg for a drum of claim 9, further comprising a compression spring disposed around the securement means screw and extending between the seat plate and the cover and acting in opposition to the securing means, providing elasticity in the connection between the cover and the seat plate such that when the securing means is tightened over the leg, the cover may reorient itself to press upon the leg and the protrusion.

12. The support leg for a drum of claim 8, wherein the cover has defined in it respective complementary installation grooves complementing and overlying the respective installation grooves in the seat plate, whereby the leg will be supported in a selected installation groove in the seat plate and the respective complementary installation groove in the cover.

13. The support leg for a drum of claim 4, wherein the protrusions are attached to the seat plate so that the cover presses upon a selected one of the two protrusions.

14. The support leg for a drum of claim 7, wherein the protrusions are attached to the seat plate so that the cover presses upon the protrusion.

15. The support leg for a drum of claim 12, wherein the protrusions are attached to the seat plate so that the cover presses upon the protrusion.

16. The support leg for a drum of claim 12, wherein the protrusions are attached to the seat plate so that the cover presses upon a selected one of the two protrusions.

* * * * *

UNITED STATES PATENT AND TRADEMARK OFFICE
CERTIFICATE OF CORRECTION

PATENT NO. : 4,869,147
DATED : September 26, 1989
INVENTOR(S) : Yoshihiro Hoshino It is certified that error appears in the above-identified patent and that said Letters Patent is hereby corrected as shown below:

Please correct the title of the invention to read:

"ATTACHMENT OF SUPPORT LEG FOR BASS DRUM"

Signed and Sealed this

Twenty-fifth Day of September, 1990

Attest:

HARRY F. MANBECK, JR.

*Attesting Officer*  *Commissioner of Patents and Trademarks*